(12) United States Patent
Miyagi

(10) Patent No.: US 10,762,557 B2
(45) Date of Patent: Sep. 1, 2020

(54) SHOPPING CART

(71) Applicant: TOSHIBA TEC KABUSHIKI KAISHA, Tokyo (JP)

(72) Inventor: Daisuke Miyagi, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 237 days.

(21) Appl. No.: 16/027,800

(22) Filed: Jul. 5, 2018

(65) Prior Publication Data

US 2019/0026819 A1    Jan. 24, 2019

(30) Foreign Application Priority Data

Jul. 19, 2017    (JP) ................. 2017-139863

(51) Int. Cl.
G06Q 30/00    (2012.01)
G06Q 30/06    (2012.01)
G06Q 10/08    (2012.01)

(52) U.S. Cl.
CPC ......... *G06Q 30/0639* (2013.01); *G06Q 10/08* (2013.01); *G06Q 30/06* (2013.01); *G06Q 30/0633* (2013.01)

(58) Field of Classification Search
CPC ................................................ G06Q 30/0639
See application file for complete search history.

(56) References Cited

U.S. PATENT DOCUMENTS

2012/0221423 A1    8/2012    Morita

FOREIGN PATENT DOCUMENTS

| JP | 5174201 B2 | 4/2013 |
| WO | 2008118906 A2 | 10/2008 |
| WO | 2011088568 A1 | 7/2011 |

OTHER PUBLICATIONS

Walmart apollo LLC; patent issued for smart shopping cart and method of use (U.S. Pat. No. 10,275,821). (May 13, 2019). Journal of Engineering Retrieved from https://search.proquest.com/docview/2225630014?accountid=14753.*
Extended European Search Report dated Oct. 16, 2018 in corresponding European Patent Application No. 18184209.7, 8 pages.

* cited by examiner

*Primary Examiner* — Kathleen Palavecino
(74) *Attorney, Agent, or Firm* — Kim & Stewart LLP

(57) ABSTRACT

A shopping cart according to an embodiment comprises a shopping basket in which items to be purchased are placed and an electronic device including a display, a memory in which a list of the items to be purchased is stored, and a processor. The processor is configured to determine a plurality of items to be returned from the list of the items to be purchased, calculate a priority value for each of items to be returned based on character of the item, determine a return sequence of the items to be returned based on the calculated priority value, and control the display to display guidance information indicating the determined return sequence of the items to be returned.

20 Claims, 5 Drawing Sheets

SHOPPING CART

CROSS-REFERENCE TO RELATED APPLICATION

This application is based upon and claims the benefit of priority from Japanese Patent Application No. 2017-139863, filed Jul. 19, 2017, the entire contents of which are incorporated herein by reference.

FIELD

Embodiments described herein relate generally to a shopping cart.

BACKGROUND

In a store such as a supermarket, a shopper puts a commodity to be purchased in a shopping basket, and once the shopper has obtained all commodities that the shopper wants to purchase, the shopper makes payment at the register.

It is common or the shopper to change his or her mind before making payment and put some commodities back to an original display place. When the shopper has two or more commodities to be put back, the shopper decides what order the commodities are to be put back.

However, from the viewpoint of a store owner, it is preferable for a commodity that is perishable or easy to deteriorate to be given priority. For example, since an ice cream product is easily degraded in the shopping basket, the store wants the shopper to put it back in the freezer as soon as possible. Nevertheless, some shoppers do not care about such conditions and may put the commodity with less risk of deterioration, such as vegetables, back prior to the ice cream product.

Under such circumstances, there is a need for a system that helps a shopper to put commodities back to their original locations in a more proper order.

DETAILED DESCRIPTION

Embodiments provide a shopping cart including an electronic device capable of guiding the return of the commodity in a particular order.

A shopping cart according to an embodiment comprises a shopping basket in which items to be purchased are placed and an electronic device including a display, a memory in which a list of the items to be purchased is stored, and a processor. The processor is configured to determine a plurality of items to be returned from the list of the items to be purchased, calculate a priority value for each of items to be returned based on character of the item, determine a return sequence of the items to be returned based on the calculated priority value, and control the display to display guidance information indicating the determined return sequence of the items to be returned.

Hereinafter, a plurality of embodiments will be described with reference to drawings.

Figure 1:
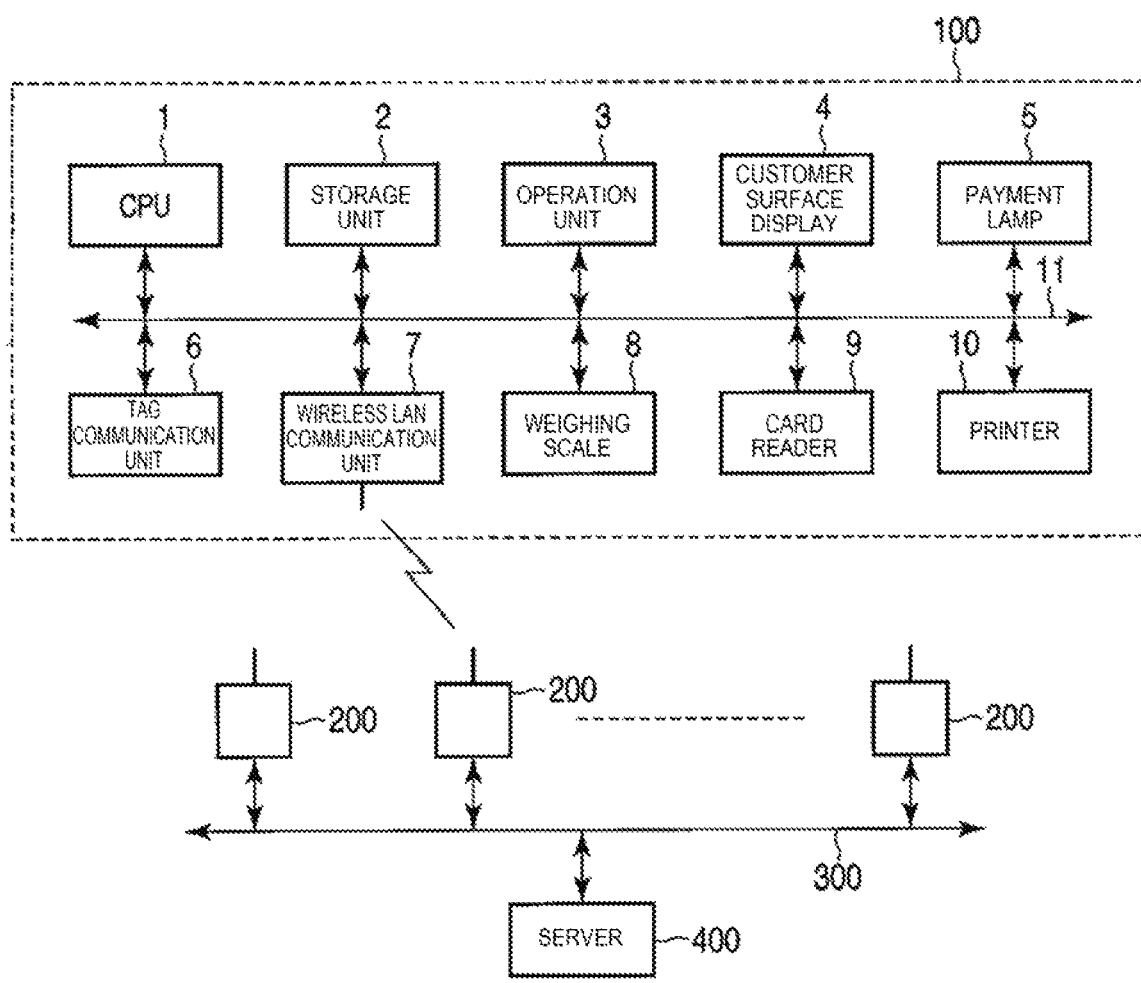
FIG. 1 is a block diagram illustrating a schematic configuration of a sales information processing system and a circuit configuration of a main portion of an electronic device provided in a shopping cart.
Figure 2:
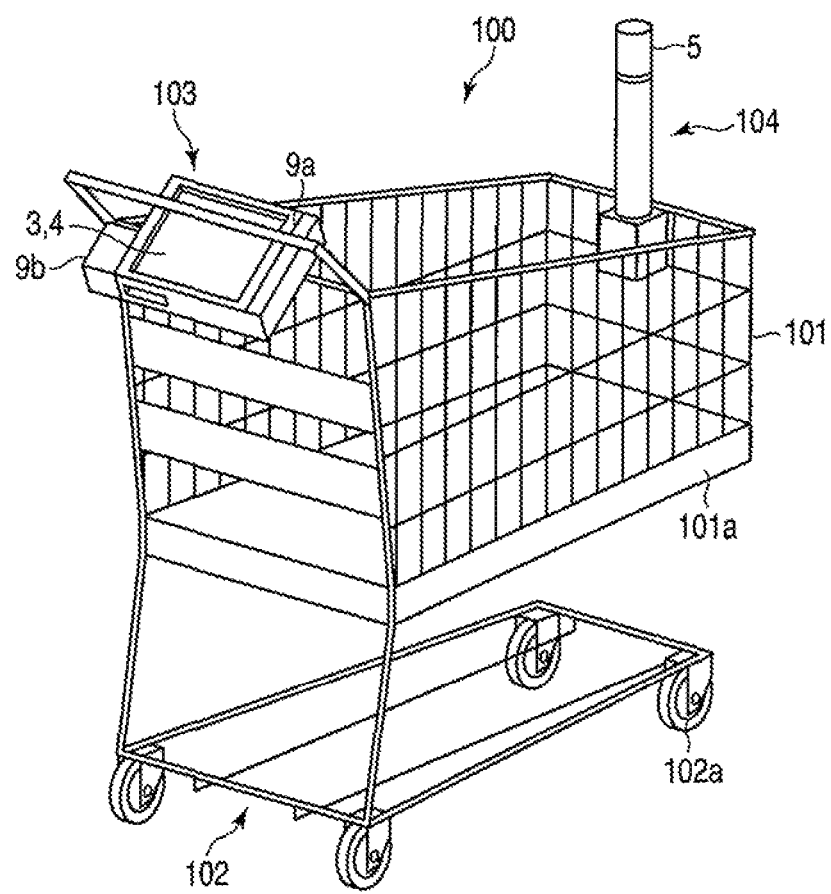
FIG. 2 is a perspective view of the appearance of the shopping cart.

FIG. 1 is a block diagram illustrating a schematic configuration of a sales information processing system and a circuit configuration of a main portion of an electronic device provided in a shopping cart 100. FIG. 2 is a perspective view of the appearance of the shopping cart 100. Electrical equipment of the shopping cart 100 has a function of an information processing terminal that performs information processing to be described later.

As illustrated in FIG. 1, as an electrical facility, the shopping cart 100 includes, a central processing unit (CPU) 1, a storage unit 2, an operation unit 3, a customer surface display 4, a payment lamps, a tag communication unit 6, a wireless local area network (LAN) communication unit 7, a weighing scale 8, a card reader 9, and a printer 10. The CPU 1, the storage unit 2, the operation unit 3, the customer surface display 4, the payment lamp 5, the tag communication unit 6, the wireless LAN communication unit 7, the weighing scale 8, the card reader 9, and the printer 10 are connected to a bus 11. The customer surface display 4, the payment lamp 5, the tag communication unit 6, the wireless LAN communication unit 7, the weighing scale 8, the card reader 9 and the printer 10 may be connected to the bus 11 via a controller and a communication cable. These electrical facilities operate with power supplied from a battery.

As illustrated in FIG. 2, the shopping cart 100 includes a commodity basket 101, a traveling mechanism 102, a user interface unit 103, and a lamp unit 104.

The CPU 1 executes information processing described later based on an operating system, a middleware, and an application program stored in the storage unit 2. The CPU 1 forms a central part of a computer including the storage unit 2.

The storage unit 2 includes a read-only memory (ROM) and a random-access memory (RAM). The storage unit 2 may include an auxiliary storage unit such as a hard disk drive or a solid state drive (SSD), for example. The storage unit 2 stores the above-described operating system, the middleware, and the application program. The storage unit 2 stores data to be referred to in performing various processes by the CPU 1 in some cases. A part of the storage area of the storage unit 2 is used as an area for storing data temporarily used by the CPU 1 in performing various processes, that is, as a work area. A part of the storage area of the storage unit 2 is used as an area for storing a purchase list, a candidate list, a return list, and an invalid list, which will be described later.

In an embodiment, the operation unit 3 is a touch screen. For example, the operation unit 3 is arranged to overlap a display surface of the customer surface display 4. When the customer touches the display screen of the customer surface display 4, the operation unit 3 outputs a detection signal corresponding to the touch position. However, various types of operation devices other than the touch screen can be appropriately used as the operation unit 3. As the operation unit 3, a combination of a plurality of touch screens and various other operation devices may be used.

In an embodiment, the customer surface indicator 4 is a liquid crystal display (LCD). The customer surface display 4 displays an image under the control of the CPU 1. The image displayed by the customer surface display 4 is an image representing various kinds of information commodities to be normally presented to a shopper who uses the shopping cart 100.

The payment lamp 5 can selectively take at least two display states under the control of the CPU 1. The two display states are, for example, a lighting state and a light-out state. Alternatively, the two display states are distinguished by two different colors (for example, red and blue). In addition, the two display states may be any state as long as a person can visually recognize the difference. The payment lamp 5 allows other shoppers around the shopper using the shopping cart to recognize the display state. It is desirable that the payment lamp 5 is arranged such that its display state can be visually recognized from anywhere in 360 degrees range in a horizontal direction, even from a long distance.

The tag communication unit 6 is a circuit that communicates with a radio frequency identification (RFID) tag attached to a commodity, and acquires an RFID tag identification code (hereinafter, referred to as a tag code) and a commodity identification code (hereinafter, referred to as a commodity code) from at least the RFID tag. The tag communication unit 6 sets a space in the commodity basket 101 as the communication range.

The wireless LAN communication unit 7 is a circuit that communicates with a server 400 via one of a plurality of wireless access points 200 and a LAN 300. The wireless access point 200 is installed at various places in the store. For example, the server 400 is a store server provided in the store, or a head office server provided in the head office that administers a plurality of stores. The server 400 may aggregate commodity sales data and manage data related to shopping cart operations. The server 400 holds a price lock up (PLU) file relating to the commodity to be sold at the store. The PLU file is a set of data records corresponding to each commodity to be sold at the store. The data record of the PLU file includes various kinds of well-known information commodities such as a commodity name, a unit price, a weight, and the like relating to the corresponding commodity in association with the commodity code given for identifying the corresponding commodity. The data record of the PLU file further includes a return flag and deterioration degree. The return flag indicates whether to return the corresponding commodity. The deterioration degree represents tendency of the commodity to deteriorate overtime. In an embodiment, a great deterioration degree is set for a commodity that is easily deteriorated. In an embodiment, the commodity that is easily deteriorated should be returned quickly. That is, the deterioration degree is an example of a priority for determining a return sequence of the items. However, the priority at the time of return may change depending on the circumstances of each store. Therefore, the deterioration degree may be determined, for example, by a manager of the store considering not only the tendency of deterioration but also other circumstances.

The weighing scale 8 measures a total weight of the commodities in the commodity basket 101.

The card reader 9 reads the card information recorded on the payment card. The payment card is a card for performing payment without cash, and may include a credit card, an integrated circuit (IC) card for electronic money, a debit card, a prepaid card, and the like.

The printer 10 is, for example, a thermal printer, a dot impact printer or the like, and prints a receipt or the like.

The commodity basket 101 forms a space for accommodating commodities therein. The bottom portion of the commodity basket 101 is a box-like case 101a. The case 101a includes the CPU 1, the storage unit 2, the tag communication unit 6, the wireless LAN communication unit 7, and the weighing scale 8. However, each unit other than the weighing scale 8 may be provided in other places such as inside the user interface unit 103. The commodity basket 101 supports the user interface unit 103 and the lamp unit 104. The traveling mechanism 102 is positioned below the commodity basket 101 and supports the commodity basket 101. The traveling mechanism 102 includes four wheels 102a, and enables the shopping cart 100 to be moved by hand pushing.

The user interface unit 103 includes the operation unit 3, the customer surface display 4, the card reader 9, and the printer 10. The display surface of the customer surface display 4 is oriented to face the shopper. In an embodiment, the card reader 9 corresponds to a magnetic stripe type credit card and a contactless type electronic money compliant IC card. The card reader 9 reads the card information from the credit card slid by the shopper along a slit 9a. The card reader 9 wirelessly reads the card information from the IC card close to a reading unit 9b. The card reader 9 can read the same type of information as the card information from the IC chip mounted on a medium other than the IC card. The printer 10 ejects a printed receipt from a discharging port 10a to the outside of the user interface unit 103. The lamp unit 104 includes the payment lamp 5. The lamp unit 104 positions the payment lamp 5 so that the lighting state of the payment lamp 5 can be easily seen from the surrounding people other than shoppers.

Next, the operation of the sales information processing system described above will be described.

When in a normal operation state, the CPU 1 executes the following information processing based on the application program stored in the storage unit 2.

Figure 3:
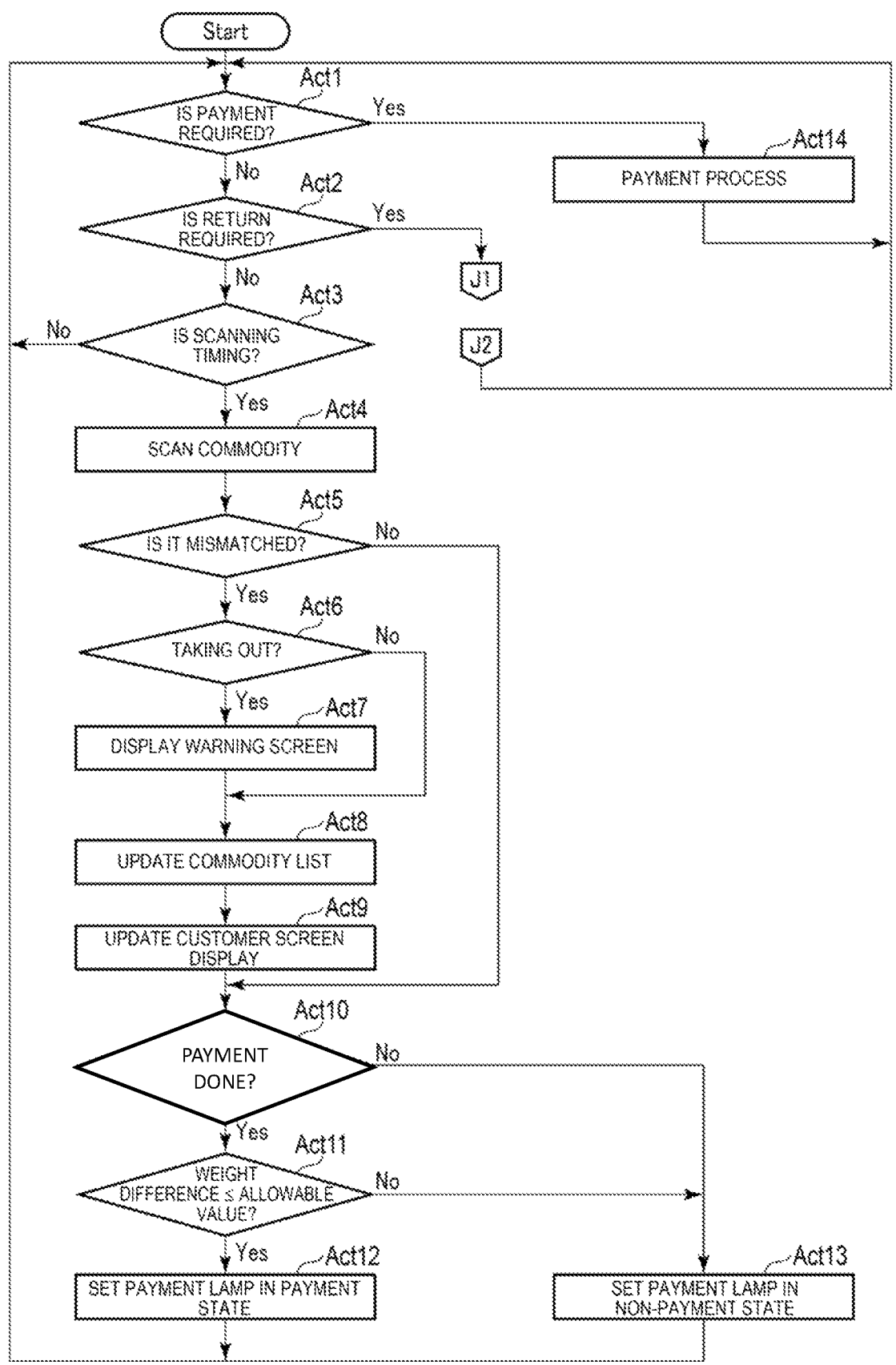
FIGS. 3 and 4 depict a flowchart illustrating a procedure executed by a CPU of the electronic device according to an embodiment.
Figure 4:
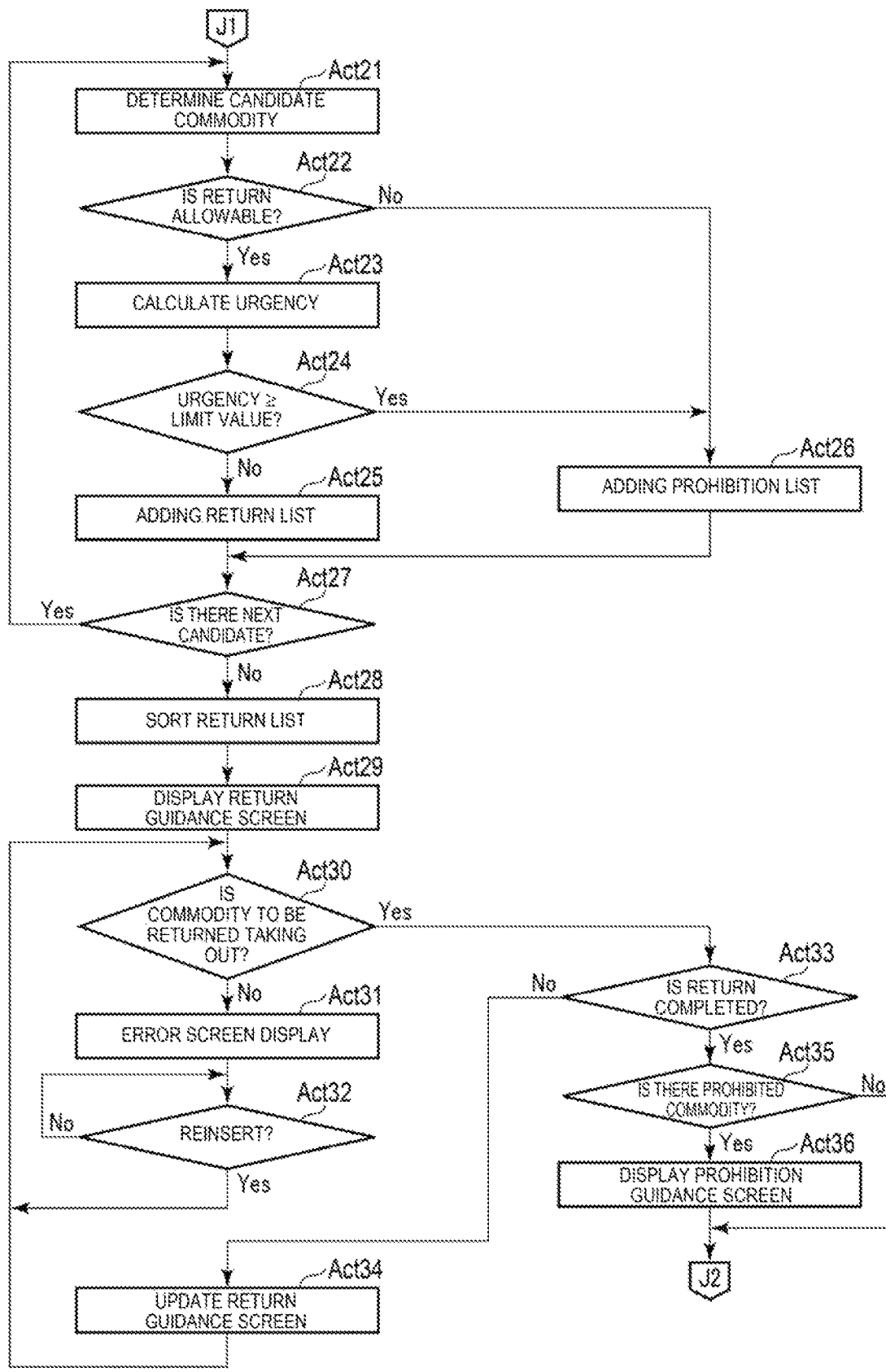

FIGS. 3 and 4 are flowcharts showing the processing procedure of the CPU 1.

As Act1, the CPU 1 determines whether a payment request is received. If the request is not received, the CPU 1 determines as No, and proceeds to Act2.

As Act2, the CPU 1 determines whether a return request is received. If the request is not received, the CPU 1 determines as No, and proceeds to Act3.

As Act3, the CPU 1 determines whether the scan timing arrives. If the scan timing does not arrived, the CPU 1 determines as No, and returns to Act1.

Thus, in Act1 to Act3, the CPU 1 waits for a payment request or return request to be received or arrival of the scan timing. If the scan timing arrives, the CPU 1 determines as Yes in Act3 and proceeds to Act5. The scan timing may be determined by, for example, a creator of the application program. In an embodiment, the scan timing is a fixed time interval.

As Act4, the CPU 1 begins the process for scanning the commodities in the commodity basket 101. Specifically, an instruction is applied to the tag communication unit 6 to acquire the information from the RFID tag attached to the commodity in the commodity basket 101, and in response to this instruction, the tag communication unit 6 transmits the information acquired from the RFID tag.

As Act5, the CPU 1 determines whether the commodity registered in the commodity list mismatches the commodity detected this time by referring the information fetched in Act3 and the information in the commodity list area. If there is the mismatch, the CPU 1 determines as Yes and proceeds to Act6.

As Act6, the CPU 1 determines whether the commodity already placed in the commodity basket 101 is taken out from the commodity basket 101. Specifically, the CPU 1 determines whether the commodity which is included in the commodity list and which is not included in the commodity detected this time exists, and if such a commodity is present, CPU 1 determines that the commodity is taken out. In this case, the CPU 1 determines as Yes and proceeds to Act7.

As Act7, the CPU 1 controls the customer surface display 4 to display a warning screen. The warning screen notifies the shopper that the commodity cannot be returned without a return operation and is previously determined as guiding the shopper to return the commodity taken out from the commodity basket 101 to the commodity basket 101. Thereafter, the CPU 1 proceeds to Act8. If the commodity is not taken out, the CPU 1 determines as No in Act6, passes Act7, and proceeds to Act8.

As Act8, the CPU 1 updates the commodity list. More specifically, a tag code and a commodity code relating to the newly detected commodity are added to the commodity list area. In addition, the CPU 1 acquires the information on the commodity name, the unit price, and the weight from the server 400 based on the commodity code, writes the information commodities in the commodity list area in association with the tag code and the commodity code, and the payment flag is in a state of indicating non-payment. In addition, the CPU 1 stores the current time in the commodity list area in association with the tag code and the commodity code as the registration time. The PLU file may be acquired from the server 400 and stored in the storage unit 2, and the CPU 1 may read the information of the commodity name, the unit price, and the weight from the storage unit 2. In addition, information on the commodities that are registered in the commodity list but that are not detected in this time is deleted from the commodity list area. That is, even if the warning screen is displayed, since the shopper may return the commodity as it is, information on the commodity taken out from the commodity basket 101 is deleted from the commodity list area. If the shopper returns the commodity to the commodity basket 101 according to the guidance on the warning screen, the CPU 1 performs Act8 at the subsequent scan timing. Therefore, the information about the commodity is also returned to the commodities list. However, in this case, the registration time inherits the information before taking out the commodity.

As Act9, the CPU 1 updates the display screen of the customer surface display 4 so as to indicate the contents of the updated commodity list. If at least one commodity is included in the commodity list, the CPU 1 causes the customer surface display 4 to display a screen showing a list of commodities or the like included in the commodity list.

As Act10, the CPU 1 determines whether payment for all of the commodities included in the commodity list is done. The commodity list includes a payment flag set to be described later so as to indicate whether payment is completed or not. Therefore, the CPU 1 determines whether all of the payment flags relating to all commodities registered in the commodity list are in the state indicating "paid", and the CPU 1 determines whether payment is completed for all of the commodities in the commodity basket 101. Then, if the payment has been done, the CPU 1 determines as Yes and proceeds to Act11.

As Act11, the CPU 1 calculates the weight difference between the total weight obtained as the sum of the weights stored in the commodity list area and the measured value at the weighing scale 8, and determines whether the weight difference is equal to or less than a predetermined allowable value. If the weight difference is equal to or less than the allowable value, the CPU 1 determines as Yes and proceeds to Act12.

As Act12, the CPU 1 sets the lighting state of the payment lamp 5 to a payment state. The payment state is, for example, in a lighting state or a lighting state in blue.

On the other hand, when payment is not completed for some commodities, the CPU 1 determines as No in Act10 and determines as No in Act11, and when the weight difference is greater than the allowable value and in either case proceed to Act13.

As Act13, the CPU 1 sets the lighting state of the payment lamp 5 to a non-payment state. The non-payment state is, for example, a light-out state or the lighting state in red.

If Act12 or Act13 is terminated, the CPU 1 returns to the standby state of Act1 to Act3.

When the payment flag, which indicates that payment for the commodity is not completed, is included in the commodity list, the CPU 1 includes a payment button on the screen of the customer surface display 4. When the shopper touches the payment button in the standby state of Act1 to Act3, if the touching is detected by the operation unit 3, the CPU 1 determines YES in Act1, and proceeds to Act14.

As Act14, the CPU 1 performs payment process for the commodity associated with the payment flag in the commodity list indicating that the payment is not completed. The CPU 1 changes the payment flag associated with the commodity to a state indicating that payment is completed. When the CPU 1 completes the payment process, the CPU 1 returns to the standby state of Act1 to Act3.

When at least one commodity is included in the commodity list, the CPU 1 includes a return button on the screen of the customer surface display 4. When the shopper touches the return button in the standby state of Act1 to Act3, if the touching is detected by the operation unit 3, the CPU 1 determines as YES in Act2 and proceeds to Act21 in FIG. 4.

As Act21, the CPU 1 determines one commodity to be returned by the shopper among the commodities included in the commodity list as a candidate commodity. For example, the CPU 1 causes the customer surface display 4 to display a screen showing the list of commodities included in the commodity list including the return buttons associated with each commodity. When the shopper touches one of the return buttons and the touching is detected by the operation unit 3, the CPU 1 determines the commodity corresponding to the touched return button as the candidate commodity.

As Act22, the CPU 1 determines whether the return of the candidate commodity is permitted. For example, the CPU 1 refers to the PLU file held by the server 400 and retrieves the state of the return flag included in the data record related to the candidate commodity. In addition, for example, the CPU 1 retrieves the state of the payment flag associated with the commodity code of the candidate commodity in the commodity list. Then, if the return of the candidate commodity is permitted and the payment flag is in the unpaid state, the CPU 1 determines as Yes and proceeds to Act23.

As Act23, the CPU 1 calculates the urgency relating to the return of the candidate commodity. The CPU 1 calculates the urgency as a greater value for the commodity to be returned earlier in a predetermined method. For example, the CPU 1 determines the urgency as the greater value as the deterioration degree of the candidate commodity is greater. In an embodiment, the urgency may be modified based on the elapsed time from the registration time of the candidate commodity. The degree of modification may be the same for each commodity or different for each commodity.

In an embodiment, the urgency value may be calculated a product of the elapsed time and a coefficient corresponding to the deterioration degree, and then adding the product to a base value corresponding to the deterioration degree. Here, both the base value and the coefficient are determined in advance as greater values as the deterioration degree is greater. The base value and the coefficient are determined so that the urgency at a certain elapsed time for a commodity with a lower deterioration degree may become greater than the urgency at the shorter elapsed time for the commodity with the greater deterioration degree. The coefficient relating to the lowest deterioration degree may be "0" and the elapsed time may be ignored. For example, in many of commodities to be stored at room temperature, since deterioration over time is very small, the coefficients for such goods may be set to "0".

As Act24, the CPU 1 determines whether the urgency calculated as described above is equal to or greater than a predetermined limit value. Then, if the urgency is less than the limit value, CPU 1 determines as No and the proceeds to Act25. If the urgency is not less than the limit value, the CPU 1 determines as Yes and proceeds to Act26. When the return of the candidate commodity is not permitted and CPU determines as No in Act22, the CPU 1 also proceeds to Act26.

As Act25, the CPU 1 adds the identification code of the candidate commodity and the urgency calculated in Act23 as a set to the return list. Therefore, the return list becomes a list of commodities that shoppers desire to return and are permitted to return. The commodities included in the return list correspond to returned commodities which stop purchasing. Thus, the CPU 1 executes the information processing based on the application program, and by executing the above-mentioned processing relating to the generation of the return list, the computer having the CPU 1 as the central portion functions as the first determination unit configured to determine the returned commodities. When the processing is ended, the CPU 1 proceeds to Act27.

As Act26, the CPU 1 adds the identification code of the candidate commodity to an invalid list. As a result, the invalid list indicates a list of candidate commodities that are not permitted to be returned or there is a risk of significant deterioration, and the return list indicates a list of commodities that can be returned. When the processing is ended, the CPU 1 proceeds to Act27.

As Act27, the CPU 1 determines whether there is the next candidate commodity. For example, when the shopper touches the return button associated with another commodity and the touching is detected by the operation unit 3, the CPU 1 determines as Yes and returns to Act21. Thus, the commodity associated with a newly touched return button is added to the return list or the invalid list. The CPU 1 declares completion of the setting of the candidate commodity by a predetermined operation such as a shopper touching a completion button included in the screen of the customer surface display 4, and if it is detected by the operation unit 3, the CPU 1 determines as No in Act27, and proceeds to Act28.

As Act28, the CPU 1 sorts the commodity codes included in the return list in descending order of the urgency associated with the commodity code. When there is a plurality of commodity codes associated with equal urgency, the CPU 1 determines the order among the plurality of commodities according to a predetermined rule. For example, the rule can be set such that "the order of commodities closest to the display place of the commodity identified by the commodity code of which the display place is one before among the plurality of commodities identified by the corresponding plurality of commodities codes is set higher.". The order of the commodity codes in the return list sorted here is the return order as described later. Thus, by executing the information processing based on the application program by the CPU 1, the computer having the CPU 1 as a central portion functions as the second determination unit configured to determine the return order based on the degree of deterioration which is an example of the priority.

As Act29, the CPU 1 causes the customer surface display 4 to display the return guidance guide screen. The return guidance screen informs the shopper to return one commodity to be returned to the display place of the commodity. Specifically, the CPU 1 selects, one commodity identified by the commodity code located at the beginning of the return list after sorting as the first commodity to be returned. The CPU 1 causes the customer surface display 4 to display the return guidance screen for returning the selected commodity to be returned to the display place. In an embodiment, this return guidance screen represents a text message and a map representing a display place to return to the sketch of the store. As the return guidance screen, it is also possible to indicate only a text message or a picture or illustration of the display place to be returned in addition to the text message.

Figure 5:
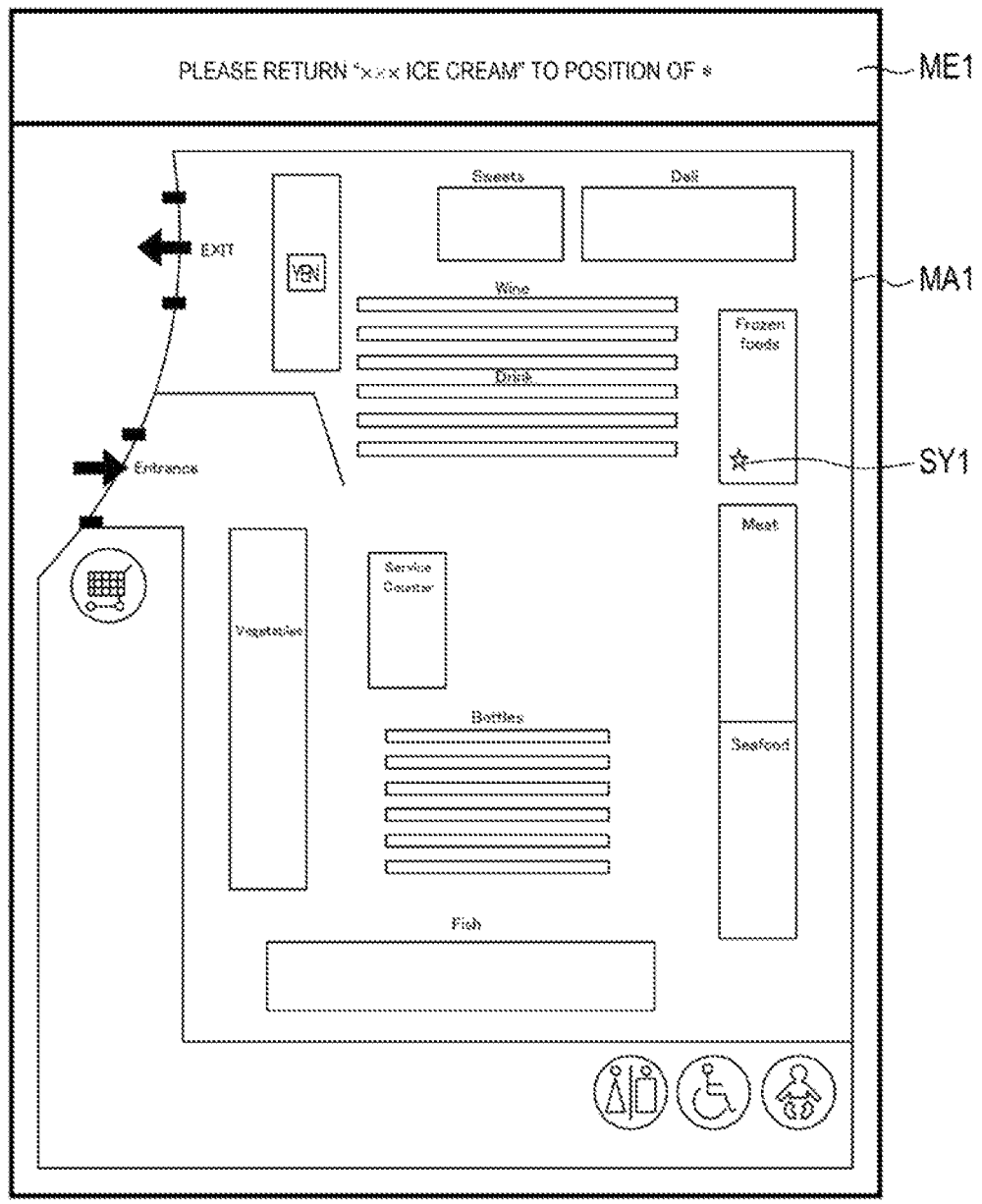
FIG. 5 is a diagram illustrating an example of a return guidance screen.

FIG. 5 is a diagram illustrating an example of the return guidance screen.

The return guidance screen illustrated in FIG. 5 is an example of a case where the commodity name of the commodity to be returned is "xxx ice cream" and includes a text message ME1 indicating the message. In addition, the return guidance screen illustrated in FIG. 5 includes a map MA1 representing a place to return as a star symbol SY1.

As Act30, the CPU 1 determines whether the commodity to be returned is taken out from the commodity basket 101. Specifically, the CPU 1 instructs the tag communication unit 6 to acquire information from the RFID tag attached to the commodity contained in the commodity basket 101, and in response to this instruction, the CPU 1 takes out the information acquired from the RFID tag by the tag communication unit 6. The CPU 1 determines whether only the commodity to be returned in the commodity detected this time is decreasing for the commodity registered in the commodity list. If the commodities detected this time match the commodities registered in the commodity list, the CPU 1 repeats the determination. If the number of commodities different from the commodity to be returned decreases, the CPU 1 determines as No, and proceeds to Act31.

As Act31, the CPU 1 displays an error screen on the customer surface display 4. The error screen notifies the shopper of an error in taking out the commodity and prompts the taken out commodity to be returned to the commodity basket 101.

As Act32, the CPU 1 determines whether the above-described taken out commodity is reinserted into the commodity basket 101. Specifically, the CPU 1 instructs the tag communication unit 6 to acquire the information from the RFID tag attached to the commodity in the commodity basket 101, and in response to this instruction, the tag communication unit 6 transmits the information acquired from the RFID tag. The CPU 1 determines whether the commodity registered in the commodity list matches the commodity detected this time. If the commodities do not match, the CPU 1 determines as No, and repeats Act32. Thus, at Act32, the CPU 1 waits for reinsertion of the taken out commodities. If the commodity registered in the commodity list matches the commodity detected this time, the CPU 1 determines as Yes in Act32 and returns to Act30.

As Act30, if only the commodity to be returned is decreased in the commodities detected in this time for the commodities registered in the commodity list in Act30, the CPU 1 determines as Yes and proceeds to Act33.

As Act33, the CPU 1 determines whether all the commodities indicated in the return list are returned. Specifically, the CPU 1 determines whether all the commodities indicated in the return list are selected as commodities to be returned. Then, if there is the commodity which is not selected yet, the CPU 1 determines as No, and proceeds to Act34.

As Act34, the CPU 1 selects the commodity which is not selected as a commodity to be returned yet among the commodities indicated in the return list as a new commodity to be returned, and returns a return guidance screen corresponding to the new commodity to be returned on the customer surface display 4. Thereafter, the CPU 1 returns to Act30. Thus, the return guidance screens corresponding to each of the plurality of returned goods are sequentially displayed in the order according to the order in the return list. The processing of displaying the return guidance screen on the customer surface display 4 in this manner corresponds to the processing of supporting the return of the returned commodity in the return order determined as described above. Thus, by executing the information processing based on the application program by the CPU 1, the computer having the CPU 1 as the central part functions as the processing unit.

When the CPU 1 determines as Yes in Act30, if the CPU 1 finishes returning all the commodities indicated in the return list, the CPU 1 determines as Yes in Act33 and proceeds to Act35.

As Act35, the CPU 1 determines whether there is a commodity that cannot be returned to the commodity designated as the candidate commodity. Specifically, the CPU 1 determines whether the commodity code is indicated in the invalid list. Then, if the commodity code is indicated in the invalid list, the CPU 1 determines as Yes and proceeds to Act36.

As Act36, the CPU 1 causes the customer surface display 4 to display the invalid guidance screen indicating the contents to guide the shopper that it is impossible to return the commodity identified by the commodity code shown in the disability list. Thus, the commodities indicated in the invalid list are those determined as non-returnable commodities. However, among the commodities included in the invalid list, the commodities that are originally returned may be included without problems. Therefore, on the invalid guidance screen, the contents notifying that the shopper may go to the service counter or the like and consult with the store staff may be included as necessary. When the processing is ended, the CPU 1 returns to the standby state of Act1 to Act3 in FIG. 4.

If the commodity code is not indicated in the invalid list, the CPU 1 determines as No in Act35, passes Act36, and returns to the standby state of Act1 to Act3 in FIG. 3. The display of the invalid guidance screen is ended under the control of the CPU 1 in response to the operation of the confirmation button shown on the invalid guidance screen, for example.

If the shopper places all the commodities to be purchased in the commodity basket 101 and finishes payment for those commodities, the shopper moves to a bag stuffing section in the store with the shopping cart 100. At the bag stuffing section, the shopper transfers the goods from the commodity basket 101 to an any container such as a plastic bag or the shopper's bag. Then, the shopper leaves the shopping cart 100 where the commodity basket 101 is empty after returning the cart to a predetermined return place. A store staff who is in charge of monitoring the bag stuffing section confirms the lighting state of the payment lamp 5, and when the shopping cart 100 which is in the non-payment state is moved to the bag stuffing section, the store staff guides the shopper who uses the shopping cart 100 to make the payment. However, the operations of the shopper and the store staff are only examples, and they may be arbitrarily changed depending on the circumstances of each store.

The CPU 1 sends transaction data representing a list of commodities purchased or a result of payment to the server 400 in response to the occurrence of a predetermined event such as when the shopping cart 100 is returned to the return place. Specifically, the CPU 1 transmits the transaction data to the server 400 from the wireless LAN communication unit 7 to the LAN 300 via the wireless access point 200. Thereafter, the CPU 1 clears any of the purchase list, the candidate list, the return list and the invalid list.

As described above, according to the shopping cart 100, when the shopper desires to return a plurality of commodities in the commodity basket 101, the urgency is determined as a greater value as the predetermined degree of deterioration for each of the commodities to be returned is greater. The return guidance screen for guiding return of each commodity to be returned is displayed in descending order of the urgency of corresponding commodities. Therefore, the guidance is made so that return of goods is performed in an appropriate order for the store side. If the shopper returns the commodities in accordance with this guidance, the return of the commodities is performed in an appropriate order for the store side.

In addition, according to the shopping cart 100, the urgency is corrected so that the elapsed time after being put in the commodity basket 101 increases as the time passes. Accordingly, it is possible to urge the shoppers to return in order taking into consideration the deterioration degree over time of each commodity of commodities, and it is possible to return the commodities in a more appropriate order.

In addition according to the shopping cart 100, for the goods which are so high that the urgency becomes higher than the predetermined limit value, for the commodities, it is not set the commodities to be returned and guides to the commodity as return. Therefore, it is possible to prevent the returned goods which have lost commercial value such as ice cream which is melted.

In addition, according to the shopping cart 100, when the commodity different from the commodity guided on the return guidance screen is taken out from the commodity basket 101, it is determined that an erroneous commodity is taken out by displaying the error screen and is prompted to return the goods to the commodity basket 101.

Accordingly, it is possible to prevent returning of goods from being performed in an order different from an appropriate order for the store side.

According to the shopping cart 100, if there is the commodity that is not returnable, an invalid guidance screen for notifying the shopper to that message is displayed. Consequently, if the shopper can recognize that if the commodity that the person wishes to return but there is the commodity not returned for guidance on the return guidance screen, the commodity cannot be returned. Therefore, it prevents the shoppers from having distrust or uneasiness, and prevents the shoppers from returning without knowing that they cannot return.

In this embodiment, the following various modifications can be implemented.

Even if the commodity has a low degree of deterioration, the CPU 1 may set the urgency of the commodity that is desirably returned earlier due to circumstances of some store side to be high.

As Act22, if the return of the candidate commodity is permitted, the CPU 1 may determine as Yes even if the payment flag is in the payment state. In this case, the CPU 1 performs refund processing on the commodity for which the payment flag is in the payment state, for example, after determining as Yes in Act33. The refund accompanying the return of such paid commodities may be carried out by the store staff.

All or a part of the various types of screens may be displayed on an any information terminal such as a smartphone possessed by shoppers, for example.

A part of the processing illustrated in FIGS. 3 and 4 may be executed by another information processing device connected to the server 400 or the LAN 300. For example, the various types of lists may be generated and stored by the server 400, and processing other than Act1 to Act3 may be performed by the server 400. However, the shopping cart operation is received by the shopping cart 100, and the CPU 1 notifies the server 400 thereof. Various types of screen displays are performed on the customer surface display 4 under instructions from the server 400.

Even when commodity carrying equipment of a different from the shopping cart 100 is used, such as a hand-held basket, it is possible to implement the same as in the above embodiment.

The payment may be performed at a payment terminal different from the shopping cart 100 at the payment section as in the conventional case. In this case, part or all of the weighing scale 8, the card reader 9, and the printer 10 may not be provided in the shopping cart 100.

The commodity identification information may be obtained by reading a barcode displayed on the commodity with a scanner or inputting a commodity selection operation by a shopper on a commodity selection screen displayed on the customer surface display 4 with the operation unit 3. Alternatively, any of a plurality of methods may be used. In addition, by analyzing the commodity displayed in the store and the moving images obtained by a large number of video cameras imaging the shoppers, the shopper may identify the commodity to be purchased.

Any notification operation may be performed by any operation that can be perceived by a person, such as display, sounding or vibration.

A part of the above-described information processing performed by the CPU 1 may be omitted. For example, the CPU 1 may omit Act6 and Act7. In addition, the CPU 1 may omit Act24 and proceed from Act23 to Act25. Furthermore, the CPU 1 may omit Act22, Act24 and Act26 and may process Act21, Act23, and Act25 in this order. In this case, the CPU 1 may also omit Act35 and Act36. In addition, Act31 and Act32 may be omitted, and in Act30, the CPU 1 may wait for retrieval of the commodity to be returned.

An application program for causing the CPU 1 to execute the information processing illustrated in FIGS. 3 and 4 may be stored in the storage unit 2 at the time of assignment of the shopping cart 100 or may be stored separately from the shopping cart 100, for example. In the latter case, the application program is recorded on a removable recording medium such as a magnetic disk, a magneto-optical disc, an optical disc, a semiconductor memory, or the like or transferred via a network. The application program may be replaced with another application program of the same type stored in the storage unit 2 of the shopping cart 100 or may be transferred as a version upgrade program for partially modifying the application program.

The functions realized by the CPU 1 by the information processing illustrated in FIGS. 3 and 4 can be partially or entirely realized by hardware for executing information processing not based on a program such as a logic circuit or the like. In addition, each of the above-described functions can also be realized by combining software control with hardware such as the above logic circuit.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A shopping cart comprising:
   a shopping basket in which items to be purchased are placed; and
   an electronic device including a display, a memory in which a list of items to be purchased is stored, and a processor,
   wherein the processor is configured to:
   determine a plurality of items to be returned from the list of the items to be purchased,
   calculate a priority value for each of items to be returned based on character of the item,
   determine a return sequence of the items to be returned based on the calculated priority value, and
   control the display to display guidance information indicating the determined return sequence of the items to be returned.

2. The shopping cart according to claim 1, wherein the processor calculates the priority value based on deterioration character of each of the items to be returned.

3. The shopping cart according to claim 2, wherein the processor calculates the priority value further based on an elapsed time after each of the items to be returned is added to the list of items to be purchased.

4. The shopping cart according to claim 3, wherein the processor calculates the priority value based on a product of a coefficient representing the deterioration character and the elapsed time of each of the items to be returned.

5. The shopping cart according to claim 4, wherein the processor compares the calculated priority value of each of the items to be returned with a predetermined value, and determines that the item is not returnable when the calculated priority value is equal to or greater than the predetermined value.

6. The shopping cart according to claim 5, wherein the processor excludes the item that is not returnable from being determined as the items to be returned from the list of the items to be purchased.

7. The shopping cart according to claim 1, wherein the guidance information is a screen that visually shows the return sequence of the item to be returned.

8. The shopping cart according to claim 7, wherein the screen includes map.

9. The shopping cart according to claim 1, further comprising a sensor configured to detect whether an item is taken from a cart, wherein after the guidance information is displayed, an error is displayed when the item taken from the cart is not the item to be returned.

10. The shopping cart according to claim 1, further comprising an input device configured to accept a user operation, wherein the processor determines that an item specified by the input device is the item to be returned.

11. An information processing method comprising:

storing a list of candidate items to be purchased;

determining a plurality of items to be returned from the list of items to be purchased;

calculating a priority value for each of the items to be returned based on character of the item;

determining a return sequence of the items to be returned based on the priority value; and displaying guidance information indicating the determined return sequence of the items to be returned.

12. The method according to claim 11, wherein the priority value is calculated based on deterioration character of the items to be returned.

13. The method according to claim 12, wherein the priority value is calculated further based on an elapsed time after each of the items to be returned is added to the list of items to be purchased.

14. The method according to claim 13, wherein the priority value is calculated based on a product of a coefficient representing the deterioration character and the elapsed time of each of the items to be returned.

15. The method according to claim 14, further comprising:

comparing the calculated priority value of each of the items to be returned with a predetermined value; and determining that the item is not returnable when the calculated priority value is equal to or greater than the predetermined value.

16. The method according to claim 15, wherein the item that is not returnable is excluded from being determined as the items to be returned from the list of items to be purchased.

17. The method according to claim 11, wherein the guidance information is displayed by visually indicating the return sequence of the items to be returned.

18. The method according to claim 17, wherein the guidance information is displayed with a map.

19. The method according to claim 11, further comprising detecting whether an item is taken from a cart, and displaying an error when the item taken from the card is not the item to be returned.

20. A non-transitory computer readable medium storing a program causing a computer to execute a display process comprising the steps of:

storing a list of items to be purchased;

determining a plurality of items to be returned from the list of items to be purchased;

calculating a priority value for each of the items to be returned based on character of the item;

determining a return sequence of the items to be returned based on the priority value; and displaying guidance information indicating the determined return sequence of the items to be returned.

* * * * *